United States Patent [19]

Wilhelm

[11] Patent Number: 4,841,198
[45] Date of Patent: Jun. 20, 1989

[54] HEADLAMP CONTROL METHOD AND APPARATUS, WITH PWM OUTPUT REGULATION

[75] Inventor: Daniel D. Wilhelm, Reed City, Mich.
[73] Assignee: Nartron Corporation, Reed City, Mich.
[21] Appl. No.: 109,917
[22] Filed: Oct. 19, 1987
[51] Int. Cl.$^4$ ............................................. B60Q 1/02
[52] U.S. Cl. ...................................... 315/82; 315/307; 307/10.8; 323/300
[58] Field of Search ................. 307/10 LS; 323/299, 323/300; 315/82, 83, 307

[56] References Cited

U.S. PATENT DOCUMENTS

| | | | |
|---|---|---|---|
| 3,891,888 | 6/1975 | Southgate | 315/82 |
| 4,230,970 | 10/1980 | Potter et al. | 323/299 X |
| 4,237,405 | 12/1980 | Kellis | 323/299 X |
| 4,326,161 | 4/1982 | Kreinberg | 323/299 |
| 4,388,558 | 6/1983 | Mizuno et al. | 315/82 X |
| 4,499,525 | 2/1985 | Mallory | 315/307 X |
| 4,686,423 | 8/1987 | Eydt | 315/82 |
| 4,739,226 | 4/1988 | Murata | 315/82 X |

Primary Examiner—Edward L. Coles, Sr.
Assistant Examiner—Mark R. Powell
Attorney, Agent, or Firm—Watts, Hoffman Fisher & Heinke

[57] ABSTRACT

A pulse width modulation control unit for energizing a vehicle head lamp. During daylight operation of a motor vehicle the control unit energizes the head lamp by pulse width modulating the battery output and coupling the modulating output across the head lamp. As battery voltage changes the pulse width modulation is adjusted to maintain power output of the head lamp. An over current condition in a switching transistor is monitored and used to de-activate the pulse width modulation of the head lamp energization.

9 Claims, 3 Drawing Sheets

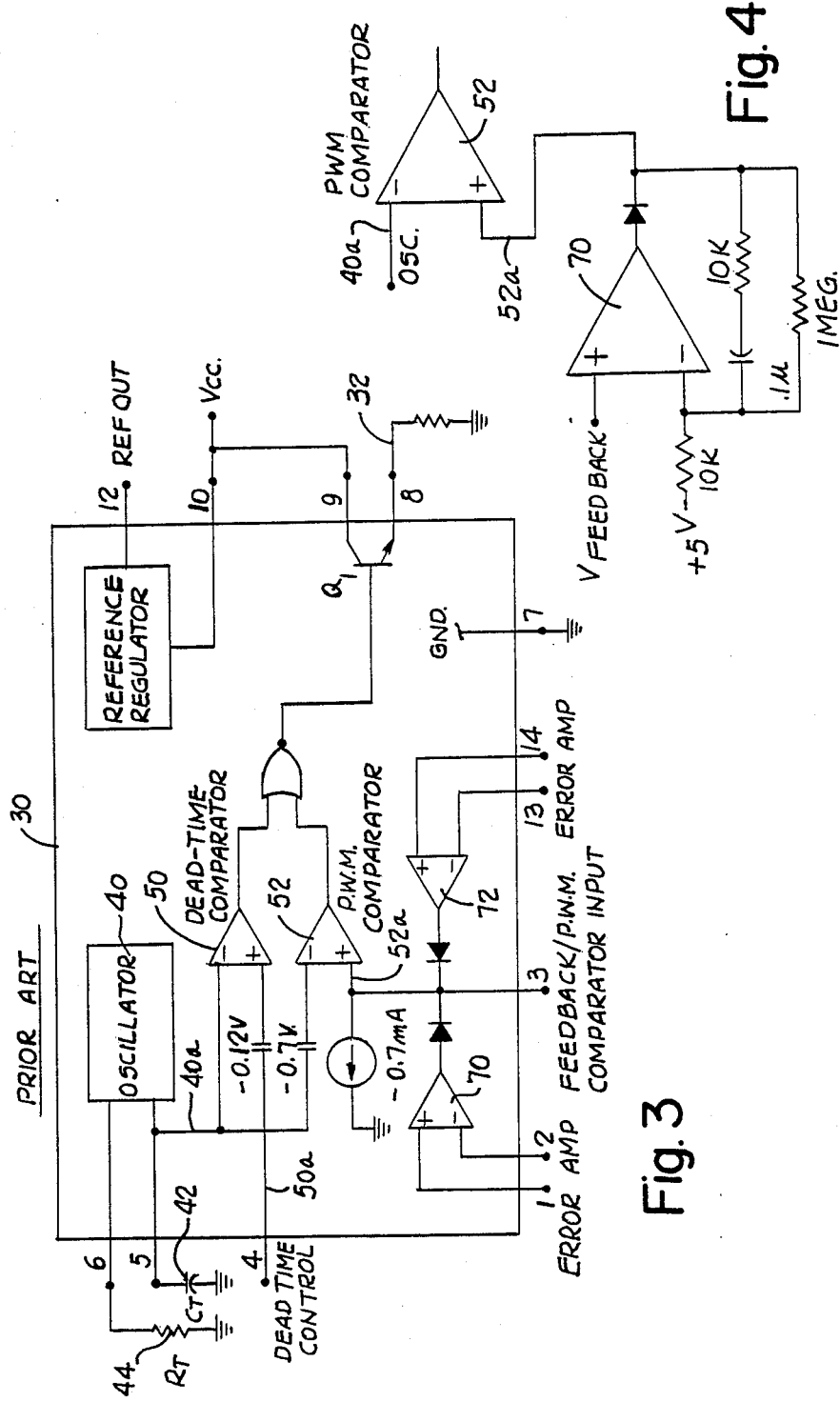

HEAD LAMP CONTROL METHOD AND APPARATUS, WITH PWM OUTPUT REGULATION

TECHNICAL FIELD

The present invention relates to a control unit for energizing one or more vehicle headlights and more particularly relates to a control unit for energizing the vehicle headlight at a reduced power level during daylight operation of the vehicle.

DISCLOSURE OF THE INVENTION

A head lamp control constructed in accordance with the present invention modulates an output signal from the vehicle battery in a way to control the power applied to the head lamp during daylight motor vehicle operation. The preferred apparatus has a modulator circuit for modulating the battery voltage at a reduced level less than normal head lamp energization. A monitoring circuit coupled to the voltage applied to the head lamp senses the power output to the head lamp and adjusts the modulation of the voltage applied to the head lamp to maintain a constant power level during daylight operation. As the battery output voltage varies, the pulse with modulation duty cycle is adjusted to maintain a constant power output to the head lamp.

The control unit includes inputs coupled to user actuated switches for activating high and low beam head lamp operation. When the motor vehicle operator activates these switches, the control unit for operating the head lamp at a reduced power output is de-activated.

Additional circuitry coupled to the control unit monitors head lamp current and de-activates the head lamp pulse width modulation energization if an over current condition is sensed. Since the head lamps draw high currents when first turned on, the over current protection circuit is de-activated for a time delay based upon the time it takes the current to stabilize when the head lamp is first energized.

One object of the invention is therefore a head lamp control unit for energizing a head lamp at reduced power output levels during daylight operation of a motor vehicle and more particularly for controlling the power applied to the head lamp regardless of vehicle battery output voltage. This and other objects, advantages and features of the invention will be better understood from the following detailed description of a preferred embodiment of the invention.

BRIEF DESCRIPTION OF THE DRAWINGS

FIG. 3 is a detailed schematic of a switching power supply utilized in the FIG. 1 circuit; and FIG. 4 is an enlarged schematic showing a feedback control feature of the FIG. 3 power supply.

BEST MODE FOR CARRYING OUT THE INVENTION

Figure 1:
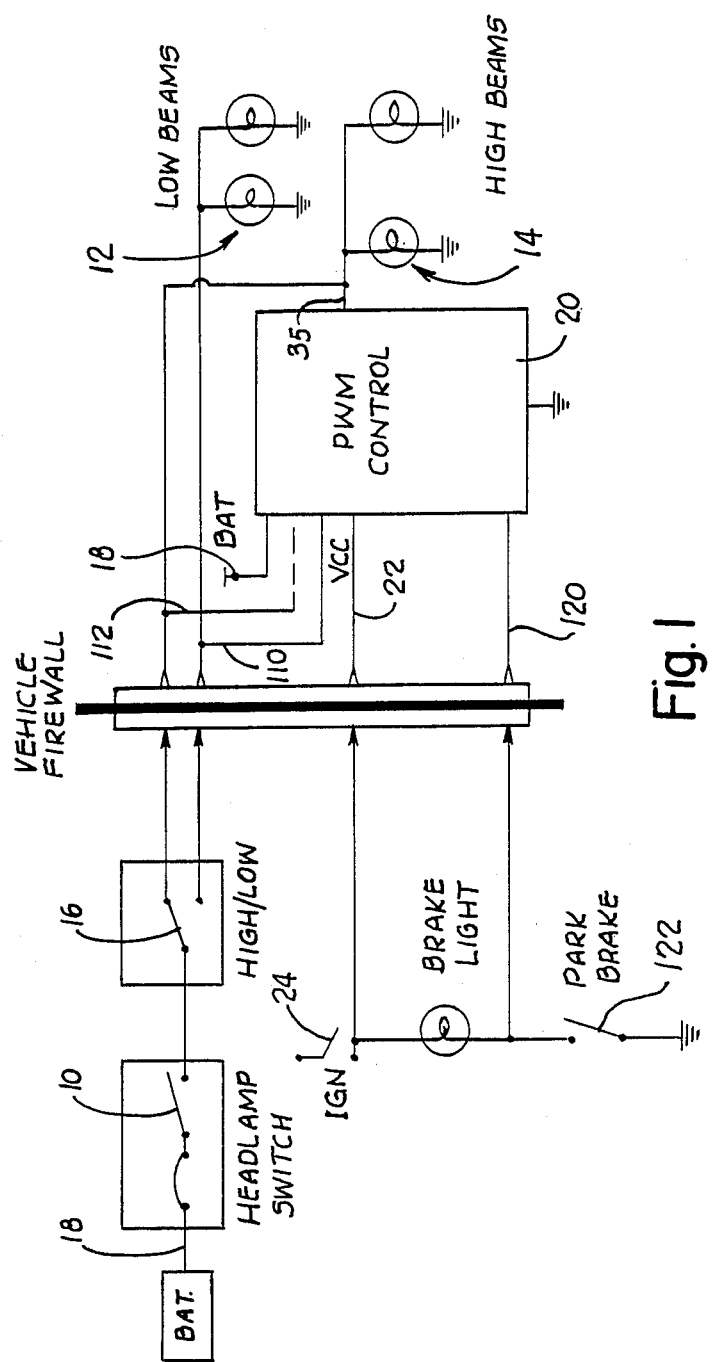
FIG. 1 is a schematic of a motor vehicle head lamp control circuit.

Turning now to the drawings, FIG. 1 is a schematic depicting a motor vehicle head lamp control circuit. When a vehicle operator activates a head lamp switch 10 either the vehicle low beam head lamps 12 or high beam head lamps 14 are energized depending upon the state of a high beam/low beam switch 16.

During normal nighttime operation, or anytime the vehicle operator turns on the vehicle headlights, a battery input 18 is coupled across the head lamps to energize the head lamps with a direct current battery output signal.

A control unit 20 monitors the output voltage across the low beam head lamps 12 and provides a pulse width modulated battery signal across the high beam lamps 14 if the low beam lamps 12 are not energized by the switch 16. During normal daylight vehicle operation, the switch 10 is open so the module 20 pulse width modulates the battery voltage 18 to energize the head lamps 14 at a reduced level. If the high beams are activated by the switch 16 the unit 20 couples a pulse width modulated battery voltage to the high beam head lamps 14, but this pulse width modulation is overridden by the direct coupling of the battery across the high beam lamps 14 by the two switches 10, 16.

Figures 2, 2A:
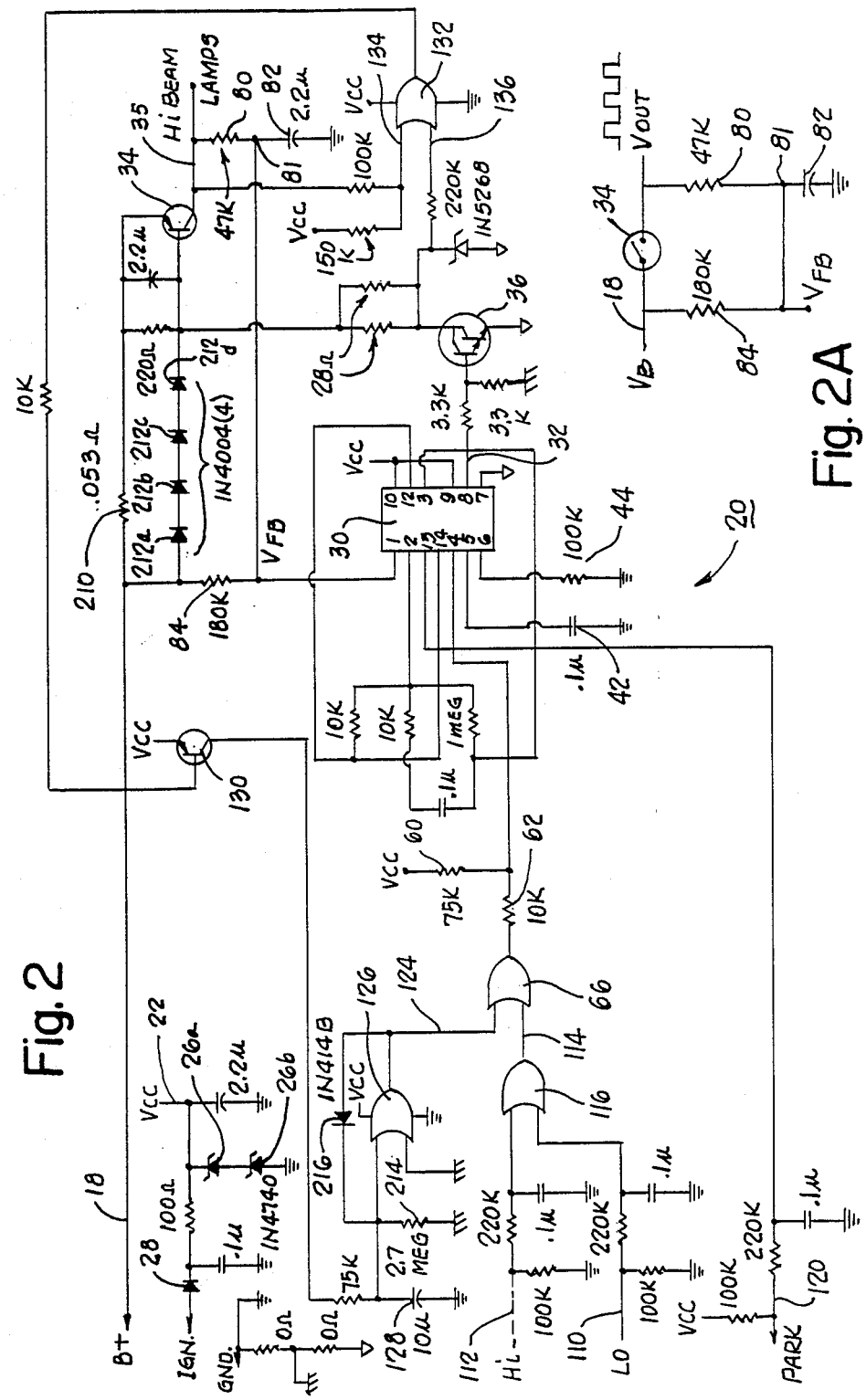
FIG. 2 is a schematic of a control unit for energizing a motor vehicle head lamp during daylight operation of the motor vehicle.

Whenever the motor vehicle operator closes an ignition switch 24, a regulated voltage (VCC) is applied to the control unit 20 via an input 22. The voltage VCC is limited to 16 volts by two zener diodes 26a, 26b (FIG. 2). Negative transients are eliminated by an input diode 28.

The control unit 20 includes a regulated switching power supply 30 (FIG. 2) having an output 32 for providing a pulse width modulated signal that turns on and off a transistor 34 which couples the battery voltage to the high beam head lamps 14 via an output 35. The output 32 is coupled to the base input of a Darlington switching transistor 36 having its collector coupled to a base of the transistor 34. When the transistor 34 conducts, the battery input 18 is coupled across the vehicle high beam head lamp 14 and by controlling the duty cycle of the output 32 from the switching power supply 30, the power applied to the head lamp is controlled.

The output 32 has a nominal duty cycle of 25% for a 12 volt battery input so that the average power applied to the head lamp is the same as a 6 volt d.c. signal. The power applied to a resistance R by a pulse width modulated voltage having a voltage V and a duty cycle D is equal to $V^2/R \cdot D$. The control unit 10 modifies the nominal 25% duty cycle of the output 32 up and down depending upon the output voltage of the battery. It is the intent that as the battery output lowers, the duty cycle will increase to maintain the power applied to the head lamp approximately constant. Conversely, as the battery voltage rises above 12 volts, the duty cycle will be reduced to again, maintain the power applied to the vehicle head lamp.

Pulse Width Modulation Control

A preferred switching power supply 30 comprises a Motorola Model MC34060P switching power supply depicted in detail in FIG. 3. The pin connections for the power supply 30 are shown in FIG. 3 as well as in FIG. 2 which depicts the control unit 20. Further details regarding this power supply are found in the publication entitled "Motorola Linear/Interface Devices" Series D pp. 4-243-4-254, Motorola 1983, previous edition 1979, which is incorporated herein by reference.

The power supply 30 includes a constant frequency sawtooth oscillator 40 whose frequency of oscillation is controlled by an external capacitor 42 and resistor 44. The values for these components designated in FIG. 2 results in a sawtooth waveform having a constant frequency oscillation of approximately 100 hertz. The sawtooth waveform increases at a constant rate until it reaches a maximum value and then falls rapidly to a minimum to begin the constant rate increase. A sawtooth waveform output 40a from the oscillator 40 is coupled to two comparator amplifiers 50, 52 internal to the power supply 30. Outputs from these two comparators 50, 52 control the state of a transistor Q1 having an emitter coupled to the output 32.

Pulse width modulation from the power supply 30 is accomplished by comparing the positive sawtooth waveform from the oscillator 40 with either of two control inputs 50a, 52a to the amplifiers 50, 52. An output from the comparator is enabled only during that portion of time when the saw tooth voltage from the oscillator 40 is greater than the control signals at the two comparator inputs. Therefore, an increase in the control signal amplitude causes a corresponding linear decrease of the output pulse width modulation duty cycle.

The input at pin 4 of the power supply 30 is a so-called dead time control input which sets a maximum duty cycle for the power supply. The power supply 30 has an effective small input offset voltage which limits the minimum voltage at input pin 4 and results in a maximum duty cycle of approximately 96%. Stated another way, the maximum on time for the transistor Q1, coupled to output pin 8 is approximately 96%.

As seen in FIG. 2, input pin 4 is also coupled to a voltage divider defined by two resistors 60, 62 which increases the dead time voltage to approximately 12% of the regulated ignition voltage, VCC. This reduces the maximum duty cycle to approximately 60% at ignition inputs of 12 volts so long as an output 64 from an OR gate 66 is low. As seen below, however, if the output from the OR gate 66 goes high the input at pin 4 also goes high causing the duty cycle at the output 32 to go to 0%. This happens because the dead time control input at pin 4 will increase to a value that is always larger than the output from the oscillator 40 and therefore the transistor Q1 (FIG. 3) never turns on.

The pulse width modulator comparator input 52a is connected to an output from two error amplifiers 70, 72 that can adjust the output pulse width from the maximum percent on time established by the dead time control input. External connections coupled to power supply pins 1, 2 and 3 are depicted in FIG. 4. These connections produce a gain of 100 amplifier to amplify the difference in input signal at pins 1 and 2 of the power supply 30 and apply that different signal to the non-inverting input of the pulse width modulator comparator 52.

As seen in FIG. 4, the inverting input to the error amplifier 70 is coupled to a five volt reference signal produced at pin 12 of the power supply 30. Deviations from this five volt signal at a so-called feedback voltage input at pin 1 cause an error signal to be generated and coupled to the comparator 52.

The feedback voltage input at pin 1 is coupled to a junction 81 between the series combination of a resistor 80 and capacitor 82 connected to the high beam lamp output from the collector junction of the transistor 34. The resistor and capacitor 80, 82 filter the modulating square wave output from the transistor 34 and produce an average d.c. signal voltage input at pin 1 of the power supply 30.

The pulse width modulation comparator 52 adjusts the pulse width modulation of the output 32 to maintain the voltage at pin 1 at 5 volts. The criteria in choosing the values of the resistor 80 (47 kohm) and a parallel resistor 84 (180 k) was to obtain an approximate 25% duty cycle for a 12 volt battery input 18. As the 12 volt battery voltage increases the voltage at the collector junction of the transistor 34 increases causing the feedback voltage $V_{FB}$ to rise above the 5 volt reference at pin 2 (FIG. 4). This causes the non-inverting input (+) to the comparator 52 to increase thereby reducing the on time of the transistor Q1. This reduces the duty cycle or on time of the transistor 34 while maintaining the power ($V^2/R \cdot D$) applied to the high beams constant to result in approximately the same illumination from the head lamps.

If the battery voltage drops below 12 volts, the feedback voltage $V_{FB}$ drops below the five volts reference causing the output from the amplifier 70 to decrease thereby increasing the duty cycle on-time of the transistor Q1. This increases the duty cycle of the lower battery voltage that is applied to the high beam head lamps and again maintains the power applied to the high beam head lamps 14 at a relatively constant level.

Pulse Width Modulation Deactivation

As noted above, when the head lamp switch 10 is closed and the low beam head lamps 12 are energized, the control unit 20 no longer pulse width modulates the battery voltage applied to the head lamps 14. An input 110 (FIG. 2) is connected to the low beam lamps 12 to sense battery energization through the switch 10. A high input at this input 110 causes an output 114 from an OR gate 116 (FIG. 2) to go high causing the OR gate 66 to produce a high output which causes pin 4 of the switching power supply 30 to increase above the peak sawtooth oscillator signal and turn off the power supply transistor Q1. This turns off the switching transistor 36 and also the output transistor 34.

A parking brake input 120 to the control unit 20 is coupled to pin 13 of the switching power supply. When this input 120 goes low due to closure of a switch 122 activated by the parking brake, pin 13 goes low, and drops below the 5 volt reference voltage at pin 14 causing the output from the amplifier 72 to increase above the peak sawtooth oscillator signal to turn off the transistor Q1. Thus, engaging the parking brake turns off the pulse width modulated energization of the vehicle high beam lights.

Current Limit Shut-down

The OR gate 66 has a second input 124 which can also deactivate the switching power supply 30. The input 124 goes high if an output from an OR gate 126 goes high in response to the charging of a capacitor 128. The capacitor 128 charges when a transistor 130 turns on in response to a low output from an OR gate 132 having two inputs 134, 136. When the transistor 130 turns on, it charges the capacitor 128 with a time constant of approximately 0.75 seconds and causes the output from the OR gate 126 to go high, disabling the pulse width modulating output from the power supply 30 through control of the dead time control at pin 4.

The OR gate 132 senses a high current condition through the high beam lamps 14 and causes a shut down of the power supply 30 if this high current is sensed for more than the 0.75 second charging time of the capacitor 128. The delay in shut down is to accommodate high beam lamp currents when the head lamp is first turned on.

The OR gate 132 generates a low output to turn on the transistor 130 if and only if both inputs 134, 136 are low. The input 136 is controlled by the Darlington switching transistor 36. When the transistor 36 turns on in response to an output 32 from the switching power supply 30 the input 136 goes low.

The voltage at the second OR gate input 134 is controlled by a voltage divider constructed from a 150 kilohm and 100 kilohm resistor pair and the collector voltage of the PNP output transistor 34. When the transistor 34 is turned on, the input 134 is high and when the transistor 34 is turned off, the input 134 is low since the collector is coupled to ground through the low resistance (~1 ohm) head lamp. During normal operation both transistors 36, 34 are on or both are off and therefore one or the other of the inputs 134, 136 is high. This produces a high output from the OR gate 132 and keeps the transistor 130 turned off.

A short circuit condition can cause the current through the transistor 34 to rise and destroy the transistor. To protect the transistor 34 and head lamp bulbs from high current damage, a Nichrome wire 210 is coupled to the emitter of the transistor 34 and four series coupled diodes 212a-d are coupled to the base of this transistor 34. The diodes 212a-d limit the voltage drop between the battery input 18 and the base of the transistor 34 to 2.8 volts (4×0.7 volts). As more current passes through the transistor 34 more current passes through the Nichrome wire 210 and the voltage across the wire 210 increases. As the current rises a situation is reached where the emitter-base voltage (2.8 volts—voltage drop across the resistor of the wire 210) drops to a point where the transistor 34 turns off. When this situation is reached the OR gate input 134 no longer oscillates as the switching transistor 36 turns on and off. Thus, whenever the transistor 36 turns on both inputs 134, 136 are low, the OR gate 132 produces a low output, and the transistor 130 charges the capacitor 128. Since the discharge path for the capacitor 128 is through a 2.7 megaohm resistor 214 the capacitor discharges an insignificant amount during the "off" periods of the transistor 36 and the high current condition soon produces a high output from the OR gate 126. A temporary high current condition in the transistor 36 is experienced when the high beam lamps 14 are first energized. This condition is temporary, however, and the transistor 34 is only turned off for a short time that is less than the 0.75 second charge time for the capacitor 128.

Once the capacitor charges to cause the OR gate 126 to change state a diode 216 latches the OR gate 126 on so that when the power supply 30 is de-activated due to high current conditions the only way it can be reactivated is by turning the ignition off and then back on.

The present invention has been described with a degree of particularity. Although the battery voltage across the high beam lamps is modulated in the disclosed embodiment, the voltage across the low beam lamps 12 could also be modulated by the control unit 20. In a low beam modulation embodiment, an input 112 from the high beam lamp energization circuit would be substituted for the input 110 used in the presently disclosed embodiment. It is the intent that the invention include all modifications and alterations from the disclosed embodiment falling within the spirit or scope of the appended claims.

I claim:

1. Apparatus for energizing a motor vehicle lamp at a designated power level comprising:
   (a) a battery for energizing said motor vehicle lamp with a battery output signal;
   (b) modulating means powered by said battery through a vehicle ignition switch for modulating the battery output signal and energizing the head lamp at the designated power level during operation of the motor vehicle; and
   (c) monitoring means for sensing a modulated energization signal coupled to the head lamp and adjusting modulation of the energization voltage to maintain the designated power level of lamp energization as the battery output signal changes during motor vehicle operation.

2. The apparatus of claim 1 wherein the monitoring means further comprises means for sensing user actuation of a vehicle lamp switch and for de-activating the modulating means when a motor vehicle operator activates the vehicle lamp by closing the lamp switch.

3. The apparatus of claim 1 where the modulating means comprises a switching power supply having a control input coupled to the monitoring means to produce a pulse width modulated output to drive the vehicle lamp at the designated power level by increasing a duty cycle of the pulse width modulated output as the battery output signal decreases and by decreasing said duty cycle as the battery output signal increases.

4. The apparatus of claim 3 wherein the modulating means comprises a transistor for coupling a voltage corresponding to the battery output signal to the lamp and the monitoring means comprises a filter coupled to the transistor for providing the control input to the switching power supply corresponding to average power applied to the vehicle lamp.

5. A method of energizing a vehicle head lamp at a predetermined power level comprising the steps of:
   (a) coupling a signal form a vehicle battery to the head lamp through a control switch;
   (b) turning on and off the control switch with a pulse width modulated signal having a nominal duty cycle to energize the head lamp at the predetermined power level with a nominal battery voltage;
   (c) sensing average voltage coupled across the head lamp by the control switch and comparing the average voltage to a nominal voltage corresponding to modulation of the nominal battery voltage at the nominal duty cycle;
   (d) adjusting a duty cycle of the pulse width modulated signal to produce the predetermined power level by decreasing the duty cycle if the average voltage exceeds the nominal voltage and increasing the duty cycle if the average voltage is less than the nominal voltage.

6. The method of claim 5 additionally comprising the step of sensing current through the head lamp and de-activating the pulse width modulated signal to the head lamp if an over current condition is sensed.

7. Motor vehicle control apparatus for energizing a motor vehicle head lamp comprising:
   (a) battery input means for supplying a vehicle battery voltage to the head lamp;
   (b) switching means for coupling the battery voltage to the head lamp;
   (c) control means for pulse width modulating the switching means to energize the head lamp with a pulse width modulated energization signal;

(d) filter means for filtering the pulse width modulated energization signal to produce a direct current signal related to power applied to the head lamp; and (e) said control means including a control input for monitoring the direct current signal and adjusting the pulse width modulation of the switching means to increase a duty cycle of the pulse width modulation as the vehicle battery voltage decreases and to decrease the duty cycle as the battery voltage increases.

8. The control apparatus of claim 7 wherein the control input includes means for sensing user activation of the head lamp to de-activate the control means thereby open circuiting the switching means.

9. The control apparatus of claim 7 additionally comprising current sensing means coupled to the control input for de-activating the control means in the event of an over current in the head lamp or the switching means.

* * * * *